(12) United States Patent
Xu et al.

(10) Patent No.: US 10,208,603 B2
(45) Date of Patent: Feb. 19, 2019

(54) STAGGERED CROSSOVERS FOR AIRFOILS

(71) Applicant: United Technologies Corporation, Hartford, CT (US)

(72) Inventors: JinQuan Xu, East Greenwich, RI (US); Scott D. Lewis, Vernon, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 330 days.

(21) Appl. No.: 14/942,025

(22) Filed: Nov. 16, 2015

(65) Prior Publication Data
US 2017/0081958 A1 Mar. 23, 2017

Related U.S. Application Data
(60) Provisional application No. 62/081,126, filed on Nov. 18, 2014.

(51) Int. Cl.
*F01D 5/18* (2006.01)
*F01D 9/06* (2006.01)

(52) U.S. Cl.
CPC .......... *F01D 5/186* (2013.01); *F01D 5/187* (2013.01); *F01D 9/065* (2013.01); *F05D 2220/32* (2013.01); *F05D 2250/25* (2013.01); *F05D 2250/314* (2013.01); *F05D 2260/202* (2013.01); *Y02T 50/672* (2013.01); *Y02T 50/673* (2013.01); *Y02T 50/676* (2013.01)

(58) Field of Classification Search
CPC .......... F01D 5/186; F01D 5/187; F01D 5/188; F01D 5/18; F01D 5/147; F01D 9/065
See application file for complete search history.

(56) References Cited

U.S. PATENT DOCUMENTS

| 5,263,820 A | 11/1993 | Tubbs |
| 5,498,133 A | 3/1996 | Lee |
| 6,206,638 B1 | 3/2001 | Glynn et al. |

(Continued)

FOREIGN PATENT DOCUMENTS

| EP | 2434093 | 3/2012 |
| EP | 2947273 | 11/2015 |

(Continued)

OTHER PUBLICATIONS

European Partial Search Report for European Patent Application No. 15195125.8 completed Apr. 6, 2016.

(Continued)

*Primary Examiner* — Logan M Kraft
*Assistant Examiner* — John S Hunter, Jr.
(74) *Attorney, Agent, or Firm* — Carlson, Gaskey & Olds, P.C.

(57) ABSTRACT

An airfoil according to an exemplary aspect of the present disclosure includes, among other things, an airfoil section having an external wall and an internal wall. The internal wall defines a first reference plane extending in a spanwise direction and through a thickness of the internal wall. A first cavity and a second cavity are separated by the internal wall. A plurality of crossover passages within the internal wall connects the first cavity to the second cavity. The plurality of crossover passages are arranged such that the passage axis of each of the plurality of cooling passages intersects a surface of the second cavity.

23 Claims, 16 Drawing Sheets

(56) References Cited

U.S. PATENT DOCUMENTS

| | | | |
|---|---|---|---|
| 6,837,683 B2 | 1/2005 | Dailey | |
| 7,063,506 B2 | 6/2006 | Davison et al. | |
| 7,273,350 B2 | 9/2007 | Kopmels et al. | |
| 7,563,072 B1 | 7/2009 | Liang | |
| 7,722,326 B2 | 5/2010 | Beeck et al. | |
| 8,678,751 B2 * | 3/2014 | Tibbott | F01D 5/186 415/115 |
| 8,920,111 B2 * | 12/2014 | Lee | F01D 5/187 415/115 |
| 2008/0226441 A1 | 9/2008 | Haselbach et al. | |
| 2011/0171023 A1 | 7/2011 | Lee et al. | |
| 2014/0193273 A1 | 7/2014 | Bommanakatte et al. | |

FOREIGN PATENT DOCUMENTS

| | | |
|---|---|---|
| EP | 2993302 | 3/2016 |
| WO | 20140175951 | 10/2014 |

OTHER PUBLICATIONS

European Search Report for European Patent Application No. 15195125 completed Sep. 20, 2016.
European Search Report for European Patent Application No. 18174950 completed Aug. 16, 2018.

* cited by examiner

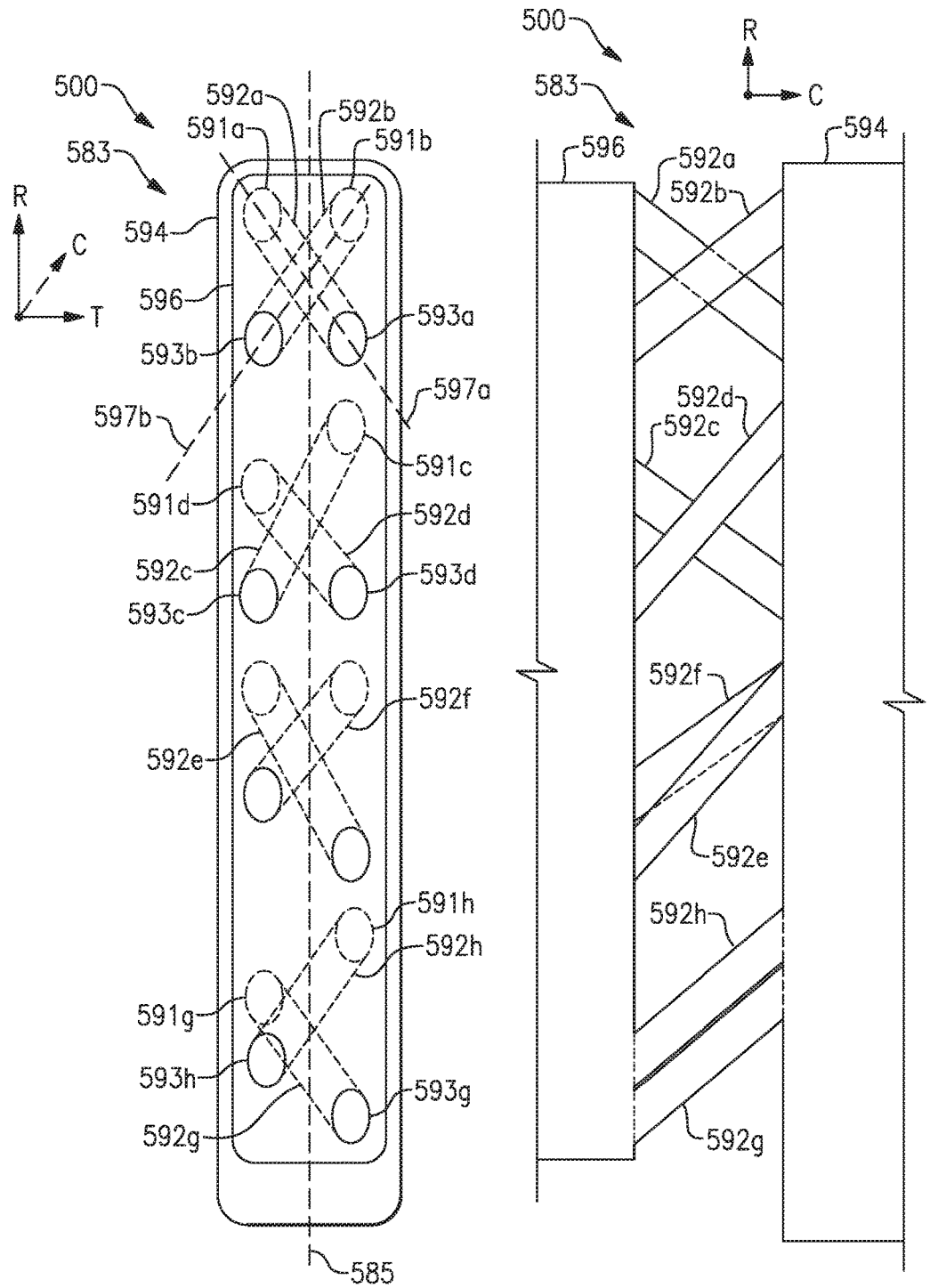

STAGGERED CROSSOVERS FOR AIRFOILS

CROSS-REFERENCE TO RELATED APPLICATION

The present disclosure claims priority to U.S. Provisional Patent Application No. 62/081,126, filed Nov. 18, 2015.

STATEMENT REGARDING FEDERALLY SPONSORED RESEARCH OR DEVELOPMENT

This invention was made with government support under Contract No. FA8650-09-D-2923-0021, awarded by the United States Air Force. The Government has certain rights in this invention.

This disclosure relates to impingement cooling for a component of a gas turbine engine.

BACKGROUND

Typical gas turbine engines include a fan delivering air into a bypass duct as propulsion air and to be utilized to cool components. The fan also delivers air into a core engine where it is compressed in a compressor. The compressed air is then delivered into a combustion section where it is mixed with fuel and ignited. Products of the combustion pass downstream over turbine rotors, driving them to rotate. In addition, static vanes are positioned adjacent to the turbine rotors to control the flow of the products of combustion.

The turbine rotors carry blades. The blades and the static vanes have airfoils extending from platforms. The blades and vanes are subject to extreme heat, and thus cooling schemes are utilized for each.

SUMMARY

An airfoil according to an example of the present disclosure includes an airfoil section having an external wall and an internal wall, and a first cavity and a second cavity separated by the internal wall. The internal wall defines a first reference plane extending in a spanwise direction and through the first cavity and the second cavity. A first set of ports and a second set of ports are distributed along the internal wall in the spanwise direction and positioned on opposite sides of the first reference plane. A plurality of crossover passages within the internal wall connects the first cavity to the second cavity. The plurality of crossover passages is arranged such that a passage axis of each of the plurality of crossover passages intersects a surface of the second cavity. The plurality of crossover passages include a first set of crossover passages connected to a common one of the first set of ports and a second set of crossover passages connected to a common one of the second set of ports.

In a further embodiment of any of the foregoing embodiments, the first set of crossover passages are positioned on a common side of the first reference plane.

A further embodiment of any of the foregoing embodiments includes a third set of ports each connected to one of the first set of crossover passages and distributed along the internal wall, and at least two of the third set of ports are positioned on opposite sides of the first reference plane.

In a further embodiment of any of the foregoing embodiments, the internal wall defines a second reference plane perpendicular to the first reference plane, and the first set of crossover passages and the second set of crossover passages are arranged such that a spanwise projection of at least one of the first set of crossover passages onto the second reference plane intersects a spanwise projection of at least one of the second set of crossover passages onto the second reference plane.

In a further embodiment of any of the foregoing embodiments, a cross-sectional area of each of the first set of crossover passages is different than a cross-sectional area of each of the second set of crossover passages.

In a further embodiment of any of the foregoing embodiments, the first set of crossover passages are distributed such that a cross-sectional area of the each of the first set of crossover passages increases in the spanwise direction.

In a further embodiment of any of the foregoing embodiments, a cross-sectional area of at least one of the first set of crossover passages is different than a cross-sectional area of another one of the first set of crossover passages.

In a further embodiment of any of the foregoing embodiments, the first set of ports is adjacent to the first cavity and the second set of ports is adjacent to the second cavity.

In a further embodiment of any of the foregoing embodiments, the first set of crossover passages and the second set of crossover passages are arranged such that a lateral projection of at least one of the first set of crossover passages onto the first reference plane intersects a lateral projection of at least one of the second set of crossover passages onto the first reference plane.

In a further embodiment of any of the foregoing embodiments, at least one of the first set of ports and at least one of the second set of ports are radially aligned in a direction of the first reference plane.

In a further embodiment of any of the foregoing embodiments, the airfoil section extends from a platform section, the platform section defining at least one of the first set of ports.

In a further embodiment of any of the foregoing embodiments, the second cavity is bounded by the external wall.

In a further embodiment of any of the foregoing embodiments, at least one of the plurality of crossover passages includes a helical geometry.

In a further embodiment of any of the foregoing embodiments, at least one of the plurality of crossover passages has a helical groove.

An airfoil according to an example of the present disclosure includes an airfoil section having an external wall and an internal wall. The internal wall defines a first reference plane extending in a spanwise direction and through a thickness of the internal wall. A first cavity and a second cavity are separated by the internal wall. A plurality of crossover passages within the internal wall connects the first cavity to the second cavity. Each of the plurality of crossover passages defines a passage axis. The plurality of crossover passages are distributed in the spanwise direction and arranged such that the passage axis of each of the plurality of crossover passages intersects a surface of the second cavity. The plurality of crossover passages includes a first set of crossover passages and a second set of crossover passages positioned on opposite sides of the first reference plane, and at least one of the first set of crossover passages includes a helical geometry.

In a further embodiment of any of the foregoing embodiments, at least two of the first set of crossover passages include a helical geometry arranged along a common axis.

In a further embodiment of any of the foregoing embodiments, at least one of the first set of crossover passages includes a first helical geometry, and at least one the second set of crossover passages includes a second helical geometry arranged such that an axial projection of the first helical geometry intersects an axial projection of the second helical geometry.

A gas turbine engine according to an example of the present disclosure includes a rotor and a vane spaced axially from the rotor. At least one of the rotor and the vane includes an airfoil section. The airfoil section includes an external wall and an internal wall. A first cavity and a second cavity are separated by the internal wall. The internal wall defines a first reference plane extending in a spanwise direction and through the first cavity and the second cavity. A first set of ports and a second set of ports are distributed along the internal wall in the spanwise direction and positioned on opposite sides of the first reference plane. A plurality of crossover passages within the internal wall connects the first cavity to the second cavity. The plurality of crossover passages is arranged such that a passage axis of each of the plurality of crossover passages intersects a surface of the second cavity. The plurality of crossover passages includes a first set of crossover passages connected to a common one of the first set of ports and a second set of crossover passages connected to a common one of the second set of ports.

In a further embodiment of any of the foregoing embodiments, the first set of ports is positioned adjacent to the first cavity and the second set of ports is positioned adjacent to the second cavity.

In a further embodiment of any of the foregoing embodiments, at least one of the first set of crossover passages and at least one of the second set of crossover passages each includes a helical geometry.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 8A illustrates a front view of a casting core corresponding to a fifth embodiment of a cooling arrangement.

FIG. 8B illustrates a side view of the casting core of FIG. 8A.

DETAILED DESCRIPTION

Figure 1:
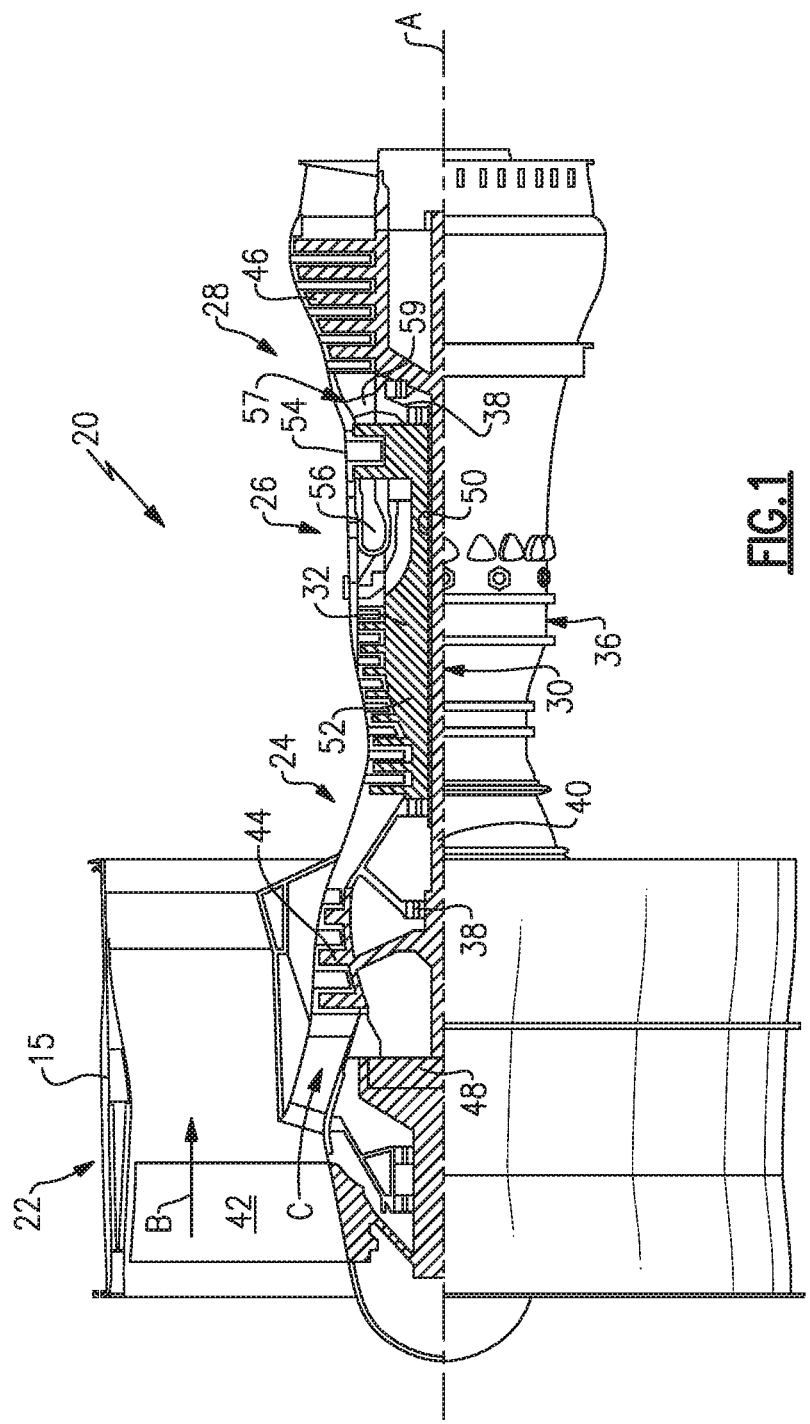
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2:
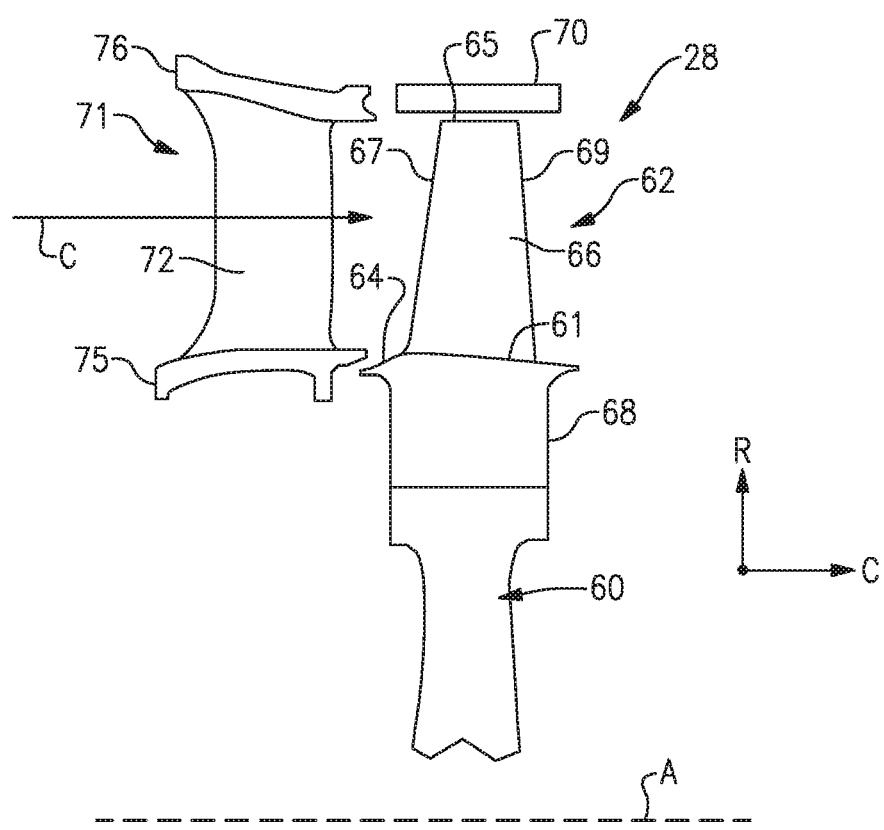
FIG. 2 schematically shows an airfoil arrangement for a turbine section.

FIG. 2 shows selected portions of the turbine section 28 including a rotor 60 carrying one or more airfoils 62 for rotation about the central axis A. In this disclosure, like reference numerals designate like elements where appropriate and reference numerals with the addition of one-hundred or multiples thereof designate modified elements that are understood to incorporate the same features and benefits of the corresponding original elements. In this example, each airfoil 62 includes a platform 64 and an airfoil section 66 extending in a radial direction R from the platform 64 to a tip 65. The airfoil section 66 generally extends in a chordwise direction C between a leading edge 67 to a trailing edge 69. A root section 68 of the airfoil 62 is mounted to the rotor 60, for example. It should be understood that the airfoil 62 can alternatively be integrally formed with the rotor 60, which is sometimes referred to as an integrally bladed rotor (IBR). A blade outer air seal (BOAS) 70 is spaced radially outward from the tip 65 of the airfoil section 66. A vane 71 is positioned along the engine axis A and adjacent to the airfoil 62. The vane 71 includes an airfoil section 72 extending between an inner platform 75 and an outer platform 76 to define a portion of the core flow path C. The turbine section 28 includes multiple airfoils 62, vanes 71, and blade outer air seals 70 arranged circumferentially about the engine axis A.

Figure 3A:
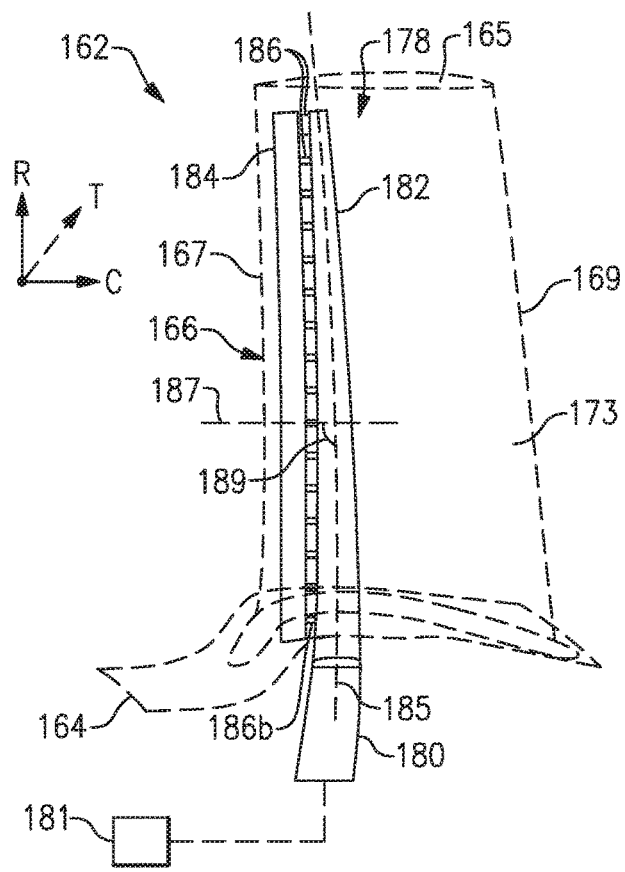
FIG. 3A illustrates a side view of a first embodiment of a cooling arrangement with an airfoil shown in phantom.
Figure 3B:
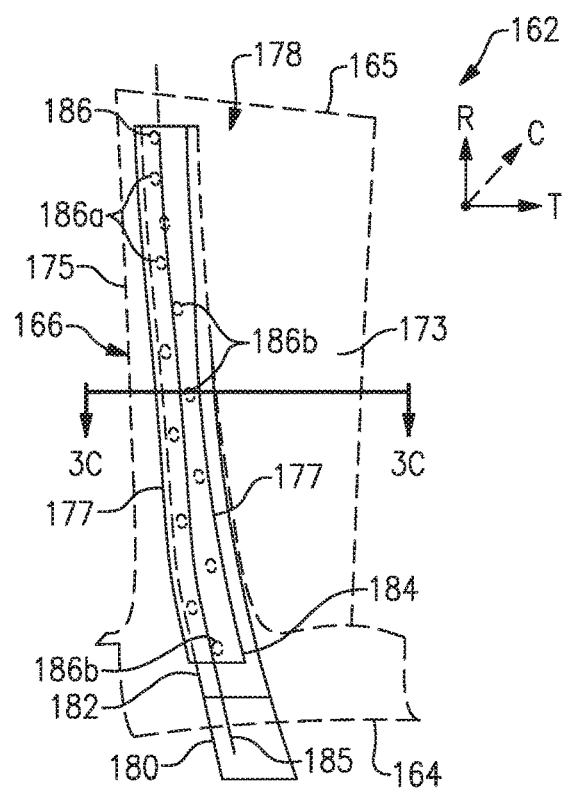
FIG. 3B illustrates a front view of the cooling arrangement of FIG. 3A.
Figure 3C:
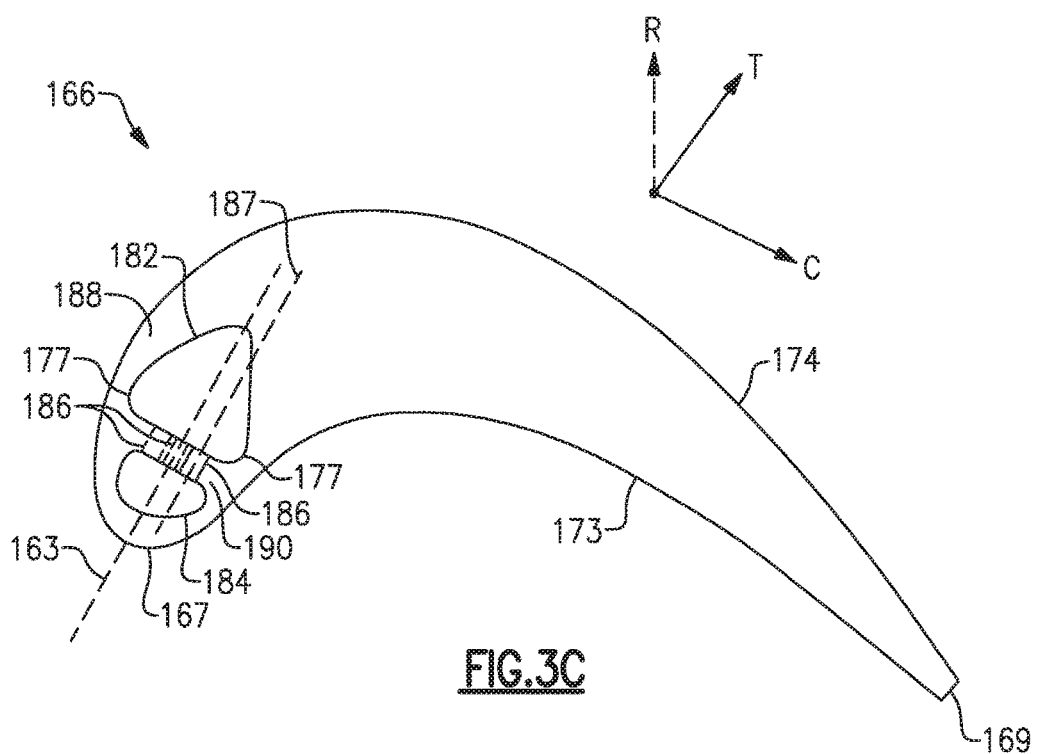
FIG. 3C illustrates a cross-sectional view of the cooling arrangement along line 3C-3C of FIG. 3A.

FIGS. 3A through 3C illustrate an exemplary cooling arrangement 178 for an airfoil 162, such as the one or more airfoils 62 of FIG. 2, according to an embodiment. Although the exemplary cooling arrangements discussed in the disclosure refer to an airfoil, it should be appreciated that other components can benefit from the teachings described herein, including BOAS 70, components within other sections of the engine 20 formed with a core and other systems such as ground-based turbine systems. Airfoil 162 is illustrated as a turbine airfoil, such as airfoil 62, but the teachings herein can also be utilized for vane 71 or another portion of the engine 20. At least one radial cooling passage 180 (only one shown for illustrative purposes) is provided between pressure and suction sides 173, 174 in a thickness direction T which is generally perpendicular to a chordwise direction C. Each radial cooling passage 180 extends from a root section through the platform 164 and toward the tip 165 to communicate coolant to various portions of the airfoil 162. An exterior surface of the airfoil 162 may include multiple film cooling holes (not shown) in fluid communication with the radial cooling passages 180 to provide film cooling to various surfaces of the airfoil 162. Each radial passage 180 is configured to receive coolant from a coolant source 181 (shown schematically). In some embodiments, the coolant source 181 is bleed air from an upstream stage of the compressor section 24 or bypass air. Other coolant sources are contemplated, such as a secondary cooling system aboard the aircraft.

The cooling arrangement 178 includes a feeding cavity 182 (or one of a first cavity and a second cavity) and an impingement cavity 184 (or the other one of the first cavity and the second cavity) extending in a radial direction R. One of the radial passages 180 communicates coolant to the feeding cavity 182. The feeding cavity 182 defines a spanwise axis 185 extending generally in the radial direction R between lateral edges 177 of the feeding cavity 182. Rather, the spanwise axis 185 can have a curvilinear geometry as illustrated in FIG. 3B. In some examples, the reference plane extending through the spanwise axis 185 may include an axial twist about the spanwise axis 185 between platform 164 and the tip 165.

One or more crossover passages 186 are located within an internal wall 190 (shown in FIG. 3C). The internal wall 190 is arranged to space apart the feeding cavity 182 and the impingement cavity 184. The internal wall 190 defines a reference plane extending in the spanwise or radial direction R along the spanwise axis 185 and through a thickness of the internal wall 190. The crossover passages 186 extend in a chordwise direction C to connect the feeding cavity 182 and the impingement cavity 184. Each of the crossover passages 186 defines a passage axis 187 arranged such that the passage axis 187 intersects a surface of the impingement cavity 184 and/or the feeding cavity 182. Each passage axis 187 defines a vertical angle 189 relative to the spanwise axis 185. The arrangement of the crossover passages 186 are such that coolant provided to the feeding cavity 182 is thereafter communicated to the impingement cavity 184 via the crossover passages 186. The coolant is communicated to the impingement cavity 184 to selectively provide impingement cooling to one or more external walls 188 of the airfoil 162.

The crossover passages 186 are staggered in the radial direction R about the spanwise axis 185, as shown in FIG. 3B. Rather, the plurality of crossover passages 186 includes a first set of crossover passages 186a and a second set of crossover passages 186b positioned in a thickness direction T on opposite sides of a first reference plane extending through the spanwise axis 185 in the chordwise direction C. The crossover passages 186 are shown having a uniform distribution in the radial direction R. In other examples, the airfoil 162 includes a non-uniform distribution of at least some of the crossover passages 186 in the radial direction R. The crossover passages 186 can be arranged in other locations of the airfoil 162, including at least one crossover passage 186b located radially below a radially outer surface 61 of the platform 164. In further examples, at least one crossover passage 186b is located radially below the platform 164 and within the root section 68.

As shown in FIG. 3C, which is a cross section of the airfoil section 166 taken along line 3C-3C, some of the crossover passages 186 can be arranged along a reference plane extending through the spanwise axis 185 and along a reference axis 163 defined by at least one of the feeding cavity 182 and the impingement cavity 184, while other crossover passages 186 can be offset or staggered relative to the reference plane. In other examples, each of the crossover passages 186 is staggered relative to the reference plane extending along the spanwise axis 185 and the reference axis 163. Although the crossover passages 186 are described herein as being staggered relative to the reference plane extending through the spanwise axis 185 in the radial direction, it should be understood that the crossover passages described herein can be staggered any direction relative to an airfoil, such as in the chordwise direction and/or thickness direction, in any manner disclosed herein.

Figure 4:
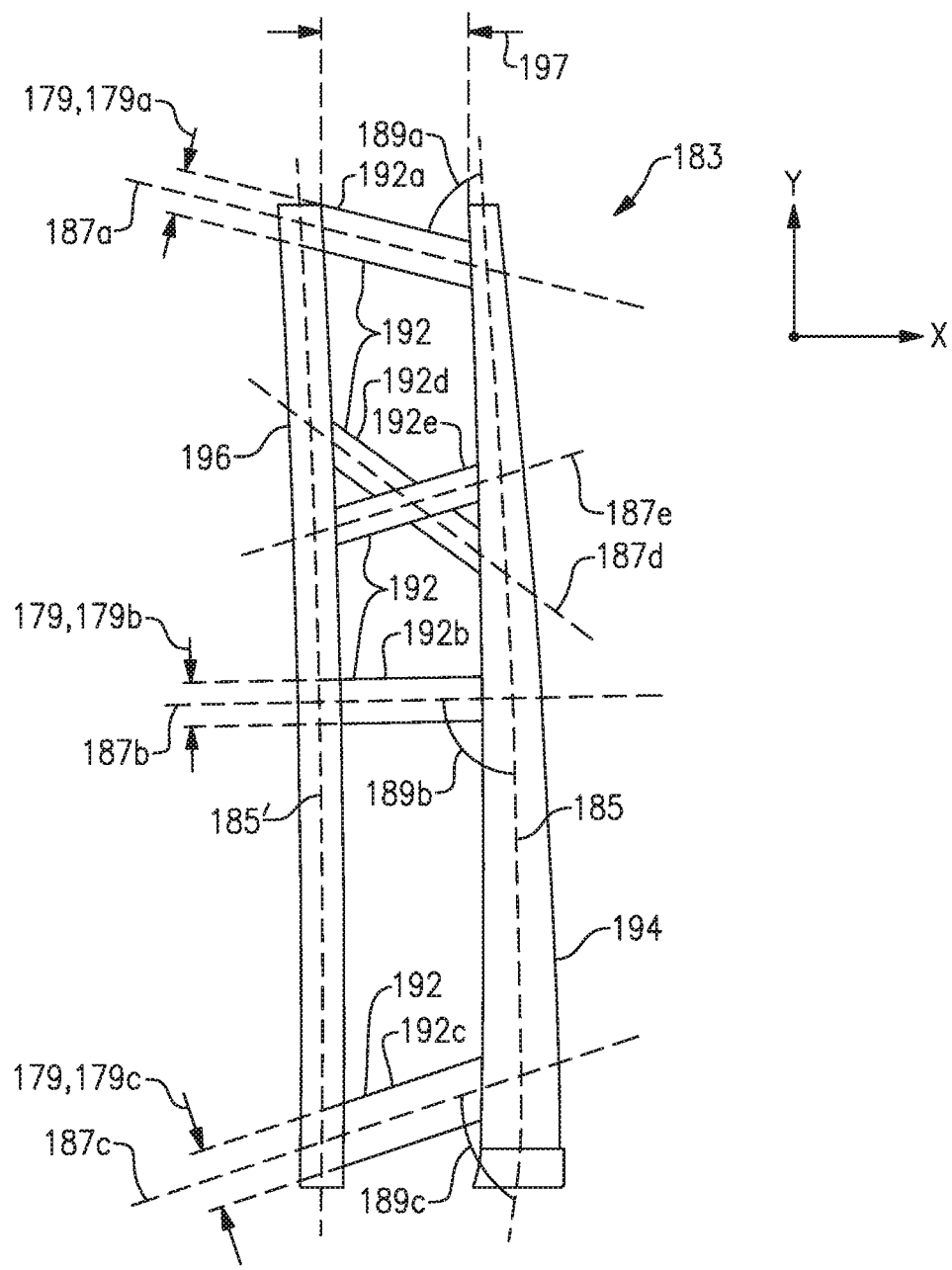
FIG. 4 illustrates a side view of a casting core corresponding to a cooling arrangement.

FIG. 4 illustrates a casting core 183 having various vertical arrangements corresponding to various cooling passages 186 of the cooling arrangement 178, for example. The casting core 183 includes a first portion 194 corresponding to the feeding cavity 182 and a second portion 196 corresponding to the impingement cavity 184, for example. In other examples, the first portion 194 corresponds to the impingement cavity 184, and the second portion 196 corresponds to the feeding cavity 182. Spanwise axis 185 is defined by the first portion 194 corresponding to the feeding cavity 182.

One or more crossover connectors 192, which correspond to the crossover passages 186, connect the first portion 194 and the second portion 196. The crossover connectors 192 cooperate with the first portion 194 and/or the second portion 196 to define an area of inertia generally along the spanwise axis 185. The first portion 194 and the second portion 196 are spaced apart in a direction of the axis X, or chordwise direction, to define a length 197 of the crossover connectors 192, which may vary between the first portion 194 and the second portion 196 in a direction of the axis Y, or spanwise direction. In some examples, axis X corresponds to the chordwise direction C of the airfoil 162, and axis Y corresponds to the radial direction R of the airfoil 162, although other spatial arrangements of the first portion 194, second portion 196 and crossover connectors 192 corresponding to an airfoil are contemplated. Three crossover connectors 192a, 192b, 192c corresponding to three crossover passages 186 of the cooling arrangement 178 are shown for illustrative purposes, although fewer or more than three crossover connectors 192 are contemplated.

Each of the crossover connectors 192 is arranged relative to the first portion 194 such that the passage axis 187 of the crossover connector 192 defines an angle 189 relative to the spanwise axis 185. Each of the crossover connectors 192 can define a different angle 189 relative to the spanwise axis 185. For example, the vertical angle 189c of the crossover connector 192c extends radially inward relative to the spanwise axis 185, and the vertical angle 189a of the crossover connector 192a extends radially outward relative to the spanwise axis 185, such that each of the vertical angles 189a, 189c defines an acute angle relative to the spanwise axis 185, according to an embodiment. In other embodiments, a difference between at least one of the vertical angles 189a, 189c and the spanwise axis 185 is between about 30° and about 150°. Crossover connector 192b is arranged such that the vertical angle 189b relative to the spanwise axis 185 is perpendicular or substantially perpendicular. It should be understood that any of the crossover passages 186 can be arranged to define a vertical angle 189 according to any of the crossover connectors 192a, 192b, 192c, and each of the crossover passages 186 can have the same or different vertical angles 189 relative to the spanwise axis 185. In other examples, the crossover connectors 192 are arranged relative to a spanwise axis 185' defined by the second portion 196, and utilizing similar techniques as described herein.

The vertical arrangement of the crossover connectors 192a, 192b, 192c can be utilized in combination with the staggering of the crossover passages 186 as illustrated in FIG. 3B. The combination of staggering and the vertical arrangement generally increases the length 197 of each of the crossover connectors 192 corresponding to the crossover passages 186, thereby increasing the convective cooling provided to portions of the airfoil 162 adjacent the crossover passages 186.

Crossover connectors 192d, 192e illustrate an arrangement corresponding to a pair of crossover passages 186 such that a lateral projection of the passage axis 187d of the first crossover connector 192d intersects a lateral projection of the passage axis 187e of the crossover connector 192e. The lateral projections of the passage axis 187d and 187e are relative to a reference plane extending along the X axis and the Y axis. The arrangement of the crossover connectors 192d, 192e can be utilized independent of, or in combination with, any of the arrangements illustrated by crossover connectors 192a, 192b and/or 192c, and with any of the crossover passages disclosed herein.

Each of the crossover connectors 192 defines a cross-sectional width 179 extending through a cross-section of the crossover connector 192. In some examples, the cross-sectional width 179 of each of the crossover connectors 192a, 192b, 192c is equal or substantially equal. In other examples, the cross-sectional width 179 of at least one of the crossover connectors 192a, 192b, 192c is different from at least one of the other crossover connectors 192a, 192b, 192c. This arrangement permits different convective cooling characteristics to portions of the airfoil adjacent the crossover passages 186 due to different cross-sectional areas of the crossover connectors 192.

Figure 5A:
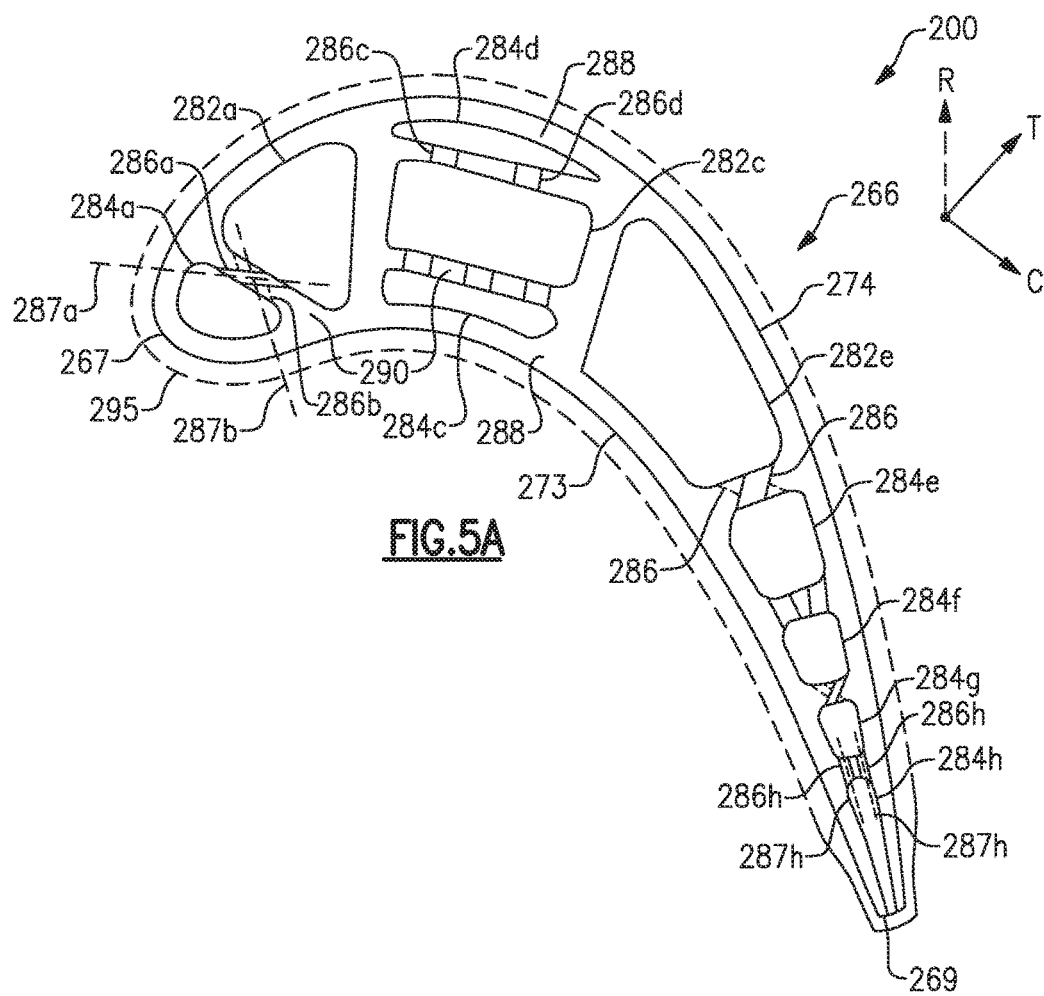
FIG. 5A illustrates a cross-sectional view of a second embodiment of a cooling arrangement for an airfoil.
Figure 5B:
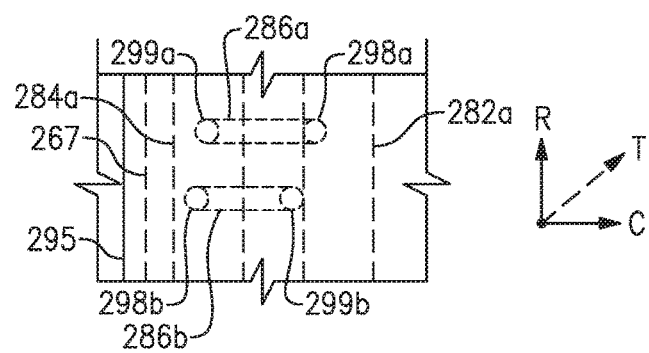
FIG. 5B illustrates a side view of a portion of the cooling arrangement of FIG. 5A.

FIG. 5A illustrates a cross-sectional top view of an embodiment 200 of an airfoil section 266 having various arrangements of crossover passages 286. As shown, airfoil section 266 includes at least one pair of crossover passages 286a, 286b configured to provide coolant from a feeding cavity 282a to an impingement cavity 284a located adjacent to a leading edge 267 of the airfoil section 266. The crossover passages 286a, 286b are arranged such that a spanwise projection of the passage axis 287a onto a second reference plane generally perpendicular to a first reference plane extending in the radial direction R (shown in FIG. 5B) intersects a spanwise projection of the passage axis 287b. Rather, the second reference plane generally extends in plane with the cross section of the airfoil section 266 shown in FIG. 5A. Similar to the arrangement of FIG. 3B, the crossover passages 286a, 286b are staggered in the radial direction as illustrated in FIG. 5B. Inlets 298a, 298b of the crossover passages 286a, 286b are spaced apart and staggered in the radial direction R, and outlets 299a, 299b of the crossover passages 286a, 286b are also staggered in the radial direction R. In other examples, either the inlets 298 or the outlets 299 are staggered in the radial direction R. This arrangement of the crossover passages 286a, 286b provides for an increased length of the crossover passages 286a, 286b compared to crossover passages arranged substantially perpendicular to the respective feeding cavity and/or impingement cavity, such as crossover passages 286c, 286d. As such, the internal surface area of the crossover passages 286a, 286b is increased, thereby, permitting additional heat transfer between the surfaces of the crossover passages 286a, 286b and adjacent portions of the airfoil, such as a leading edge 267 of the airfoil section 266 which may experience relatively higher temperatures than a trailing edge 269 of the airfoil section 266. It should be appreciated that the rigidity of the arrangement of the crossover passages 286a, 286b may be different than the rigidity of the crossover connectors forming the crossover passages 286c, 286d.

The airfoil section 266 can include multiple feeding cavities and impingement cavities to provide cooling to various portions of the airfoil section 266. For example, the airfoil section 266 includes a mid-feed cavity 282c spaced from the external walls 288 to provide coolant to a pair of impingement cavities 284c, 284d arranged adjacent to pressure side 273 and suction side 274 of the airfoil section 266, respectively, with crossover passages 286c, 286d staggered in the radial direction R similar to the crossover passages 186 shown in FIG. 3B. The airfoil section 266 can also include a series of feeding and impingement cavities arranged sequentially with respect to one another. For example, a first feeding cavity 282e is arranged with respect to a downstream set of impingement cavities 284e, 284f, 284g, 284h, with impingement cavity 284h bounded by the trailing edge 269 of the airfoil section 266.

In some embodiments, a thermal barrier coating (TBC) 295 is disposed on a surface of the airfoil section 266 to reduce heat transfer between the core airflow path C and the airfoil section 266. The thermal barrier coating 295 can be disposed on a surface of the airfoil section 266 utilizing various techniques, such as air plasma spraying or chemical vapor deposition. According to some embodiments, the thermal barrier coating 295 can be made of various materials such as ceramics, alumina, or zirconia, although other materials or composites are also contemplated. According to an embodiment, thermal barrier coating 295 can taper from the leading edge 267 to the trailing edge 269 of the airfoil section 266 to provide a desired aerodynamic profile. Impingement cavity 284h can be fed by crossover passages 286h, in which the spanwise projection of each passage axis 287h does not intersect the other passage axis 287h. This arrangement permits coolant to be communicated at a relatively lower temperature than the arrangement of crossover passages 286a, 286b having intersecting spanwise projections, for example.

Figure 6:
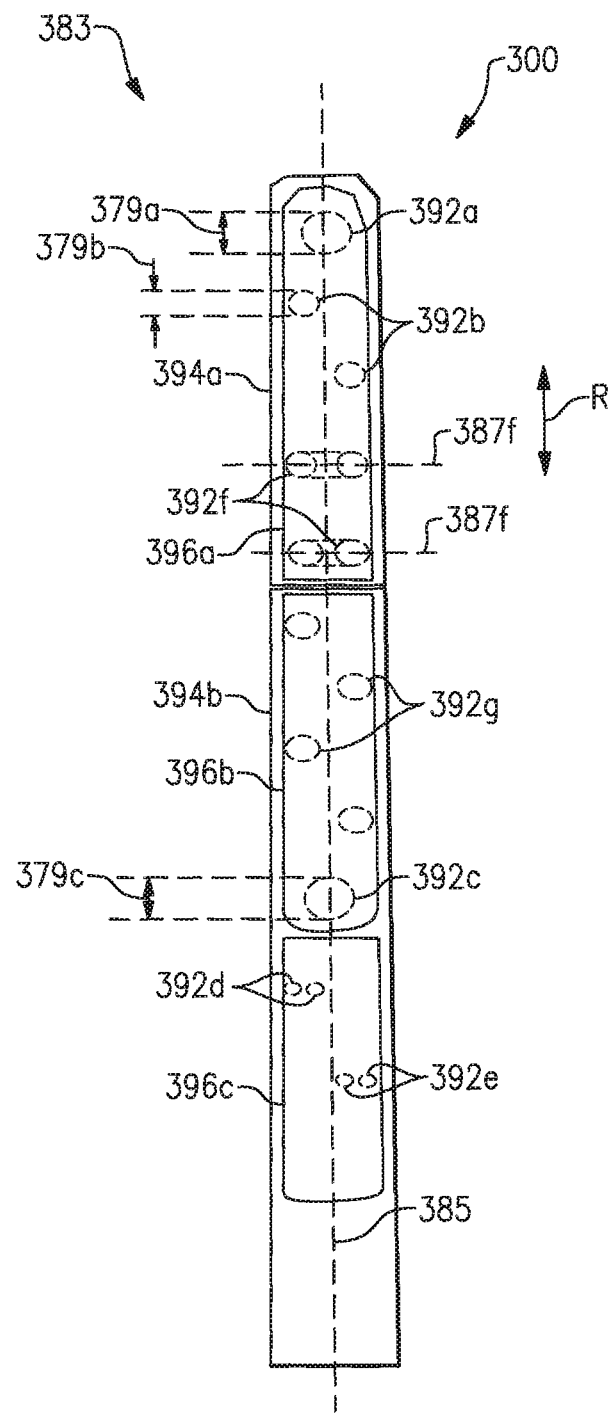
FIG. 6 illustrates a front view of a casting core corresponding to a third embodiment of a cooling arrangement.

FIG. 6 illustrates a front view of an embodiment 300 of a casting core 383 corresponding to a cooling arrangement. In this arrangement, the casting core 383 includes a plurality of crossover connectors 392 which can correspond to arrangements of the crossover passages 186, 286. The casting core 383 includes a first set of crossover connectors 392a and a second set of crossover connectors 392c spaced in the radial direction R between an intermediate set of crossover connectors 392b. As shown, a cross-sectional width 379b of each of the intermediate set of crossover connectors 392b is different than a cross-sectional width of at least one of the first set of crossover connectors 392a and the second set of crossover connectors 392c. Accordingly, a cross-sectional area of each of the intermediate set of crossover connectors 392b is different than a cross-sectional area of at least one of the first set of crossover connectors 392a and the second set of crossover connectors 392c. As shown, the cross-sectional width 379b of the intermediate set of crossover connectors 392b is less than a cross-sectional width of each of the first set and second set of crossover connectors 392a, 392c. In one example, a cross-sectional area of at least one of the first set and second set of crossover connectors 392a, 392c to a cross-sectional area of the intermediate set of crossover connectors 392b is less than or equal to about 2:1. However, other cross-sectional arrangements are contemplated herein.

In some examples, the casting core 383 can include at least two or more crossover connectors 392d connected to the first portion 394b and a second portion 396c. The crossover connectors 392d are positioned on a common side of a reference plane extending through the spanwise axis 385 and at substantially the same radial position along the spanwise axis 385. In further examples, one or more sets of crossover connectors, such as crossover connectors 392e, can be substantially aligned on an opposite side of the reference plane relative to the spanwise axis 385 and the crossover connectors 392d. It should be appreciated that the various combinations of any of the crossover connectors 392 can be utilized in any of the cooling arrangements disclosed herein.

The casting core 383 can include at least two first portions 394a, 394b and at least two second portions 396a, 396b extending in the radial direction R. In this configuration, the first portion 394a and the second portion 396a share a first set of crossover connectors 392f, and the first portion 394b and the second portion 396b share a second, different set of crossover connectors 392g. Of course, more than two first portions 394 and more than two second portions 396 can be utilized. As shown, the crossover connectors 392f are arranged such that a spanwise projection of each passage axis 387f intersects each other, similar to the arrangement of the crossover passages 286a, 286b of FIG. 5A, whereas a spanwise projection of each passage axis of the crossover connectors 392b do not intersect.

Figure 7:
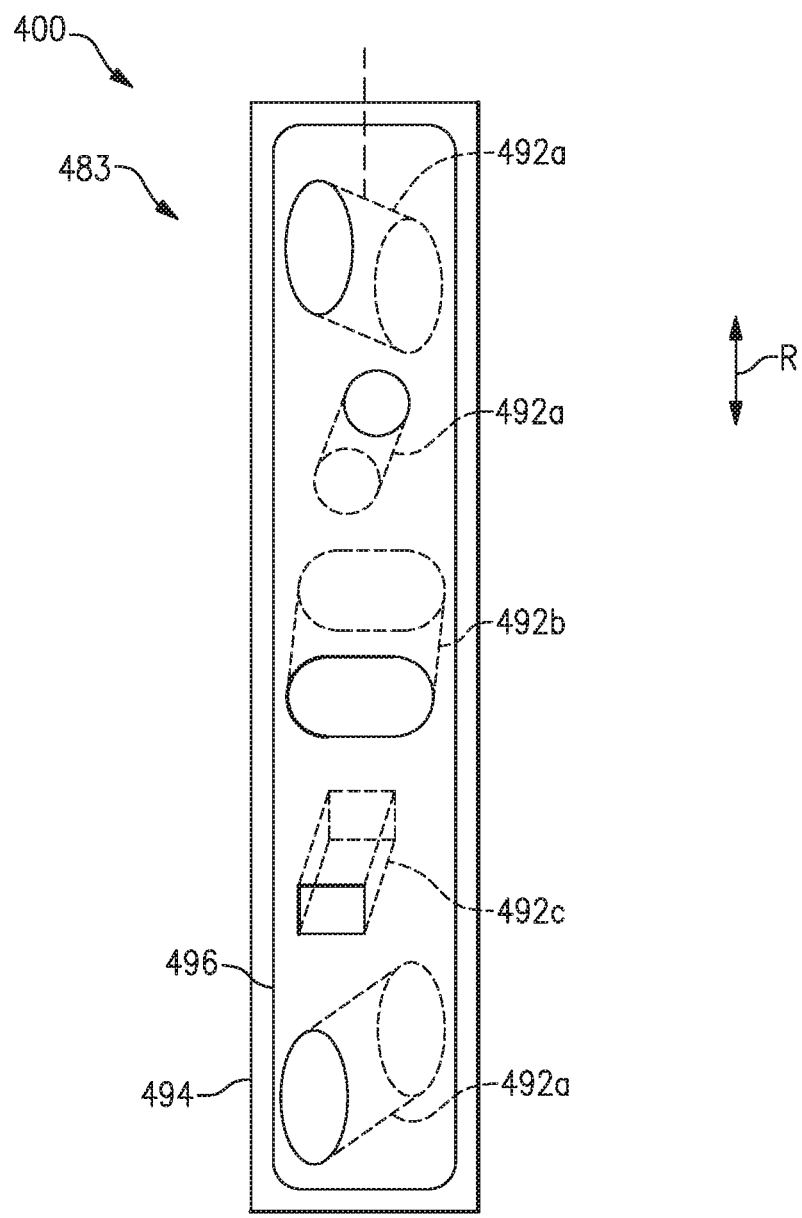
FIG. 7 illustrates a front view of a casting core corresponding to a fourth embodiment of a cooling arrangement.

FIG. 7 illustrates a front view of an embodiment 400 of a casting core 483 illustrating various geometries which can be utilized for any of the crossover passages disclosed herein. As shown, some embodiments of the crossover connectors, such as crossover connectors 492a, can have an elliptical cross-sectional profile. In other embodiments, the crossover connectors can have a racetrack-shaped geometry as illustrated by the crossover connector 492b. In some embodiments the crossover passages can also have a rectangular or quadrilateral geometry, such as that illustrated by crossover connector 492c. However, it should be appreciated that other geometries of the crossover connectors and crossover passages are contemplated herein. Any of the crossover connectors 492 can be staggered along a reference plane with respect to other crossover connectors in any manner disclosed herein. In addition, in certain embodiments any single casting core 482 may have substantially similar crossover connector shapes, or may have a combination of the above referenced shapes in a single casting core.

FIGS. 8A and 8B illustrate an embodiment 500 of a casting core 583 illustrating various geometries corresponding to crossover passages wherein chordwise projections of the crossover connectors 592 intersect each other. The casting core 583 includes at least one pair of crossover connectors 592a, 592b having different radial and lateral orientations relative to a spanwise axis 585. The crossover connectors 592a, 592b are arranged to extend between first ends 591a, 591b attached to the first portion 594 and second ends 593a, 593b attached to the second portion 596. The first ends 591a, 591b and the second ends 593a, 593b correspond to respective inlets and outlets of crossover passages disclosed herein. The first ends 591a, 591b are arranged at approximately the same radial position relative to the spanwise axis 585, and the second ends 593a, 593b are also arranged at approximately the same radial position such that a projection of passage axis 587a and 587b intersect each other when projected in the chordwise direction C. In this arrangement, crossover passages corresponding to the crossover connectors 592a, 592b are in fluid communication with each other at the area of intersection. However, the crossover connectors 592a, 592b may have a curved geometry such that the crossover connectors 592a, 592 do not intersect each other.

Other arrangements of the crossover connectors 592 are contemplated. In some examples, the casting core 583 includes at least one pair of crossover connectors 592c, 592d with first ends 591c, 591d staggered and second ends 593c, 593d at least substantially aligned in the radial direction R. In other embodiments, the casting core 583 includes at least one pair of crossover connectors 592e, 592f with first ends 591e, 591f at least substantially aligned and second ends 593e, 593f staggered in the radial direction R. In further examples, the casting core 583 includes at least one pair of crossover connectors 592g, 592h having first ends 591g, 593h and second ends 593g, 593h staggered relative to the spanwise axis 585. The arrangement of the various crossover connectors 592 can further increase a length corresponding to the crossover connectors to provide additional surface area and enhanced heat transfer characteristics.

Figure 9A:
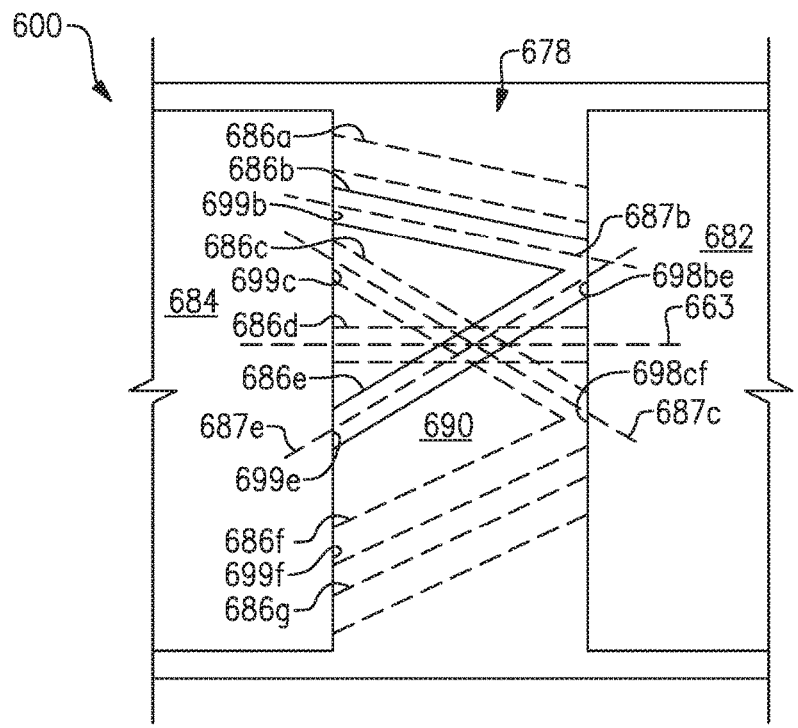
FIG. 9A illustrates a top view of a cooling arrangement casting according to a sixth embodiment.

FIG. 9A illustrates an embodiment 600 of a cooling arrangement 678 having at least two sets of crossover passages 686 each sharing a common port 698, 699 staggered about a reference plane 663. The cooling arrangement 678 includes a first cavity, such as a feeding cavity 682, and a second cavity, such as an impingement cavity 684. The cooling arrangement 678 includes a first set of crossover passages 686b, 686e, which are connected to a common port or inlet 698be. The common inlet 698be is configured to receive coolant from the feeding cavity 682, and the crossover passages 686b and 686e are arranged to distribute coolant from the inlet 698be to different areas of the impingement cavity 684. The cooling arrangement 678 includes a second set of crossover passages 686c, 686f. The crossover passages 686c and 686f share a common port or inlet 698cf. The inlets 698be and 698cf are distributed or staggered along an internal wall 690 on opposite sides of the reference plane 663.

In some embodiments, a projection of a passage axis 687e of the crossover passage 686e onto a reference plane intersects a projection of a passage axis 686c of a corresponding crossover passage 686c. In other examples, the first set of crossover passages 686b, 686e and the second set of crossover passages 686c, 686f include corresponding outlets 699b, 699e and 699e, 699f distributed on opposite sides of the reference plane 663. In one embodiment, the outlets 699b and 699e are distributed on a common same side of the reference plane 663, and the outlets 699e and 699f are distributed on a common side of the reference plane 663. In some embodiments, a cross-sectional area of the first set of crossover passages 686b, 686e is different than a cross-sectional area of the second set of crossover passages 686c, 686f. The arrangement of common ports 698, 699 staggered about the reference plane 663 increases the rigidity of a corresponding casting core.

Figure 9E:
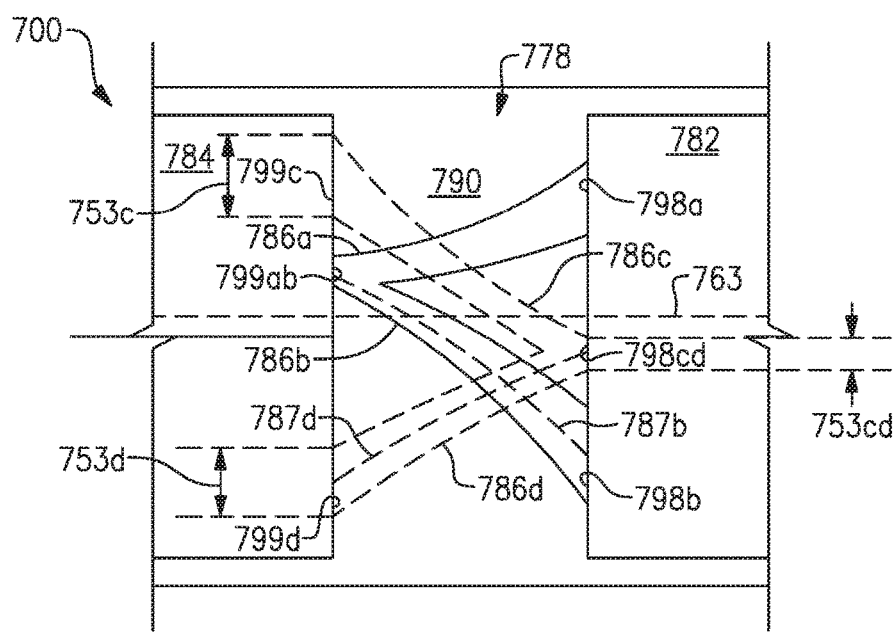
FIG. 9E illustrates a top view of a cooling arrangement according to a seventh embodiment.
Figure 9B:
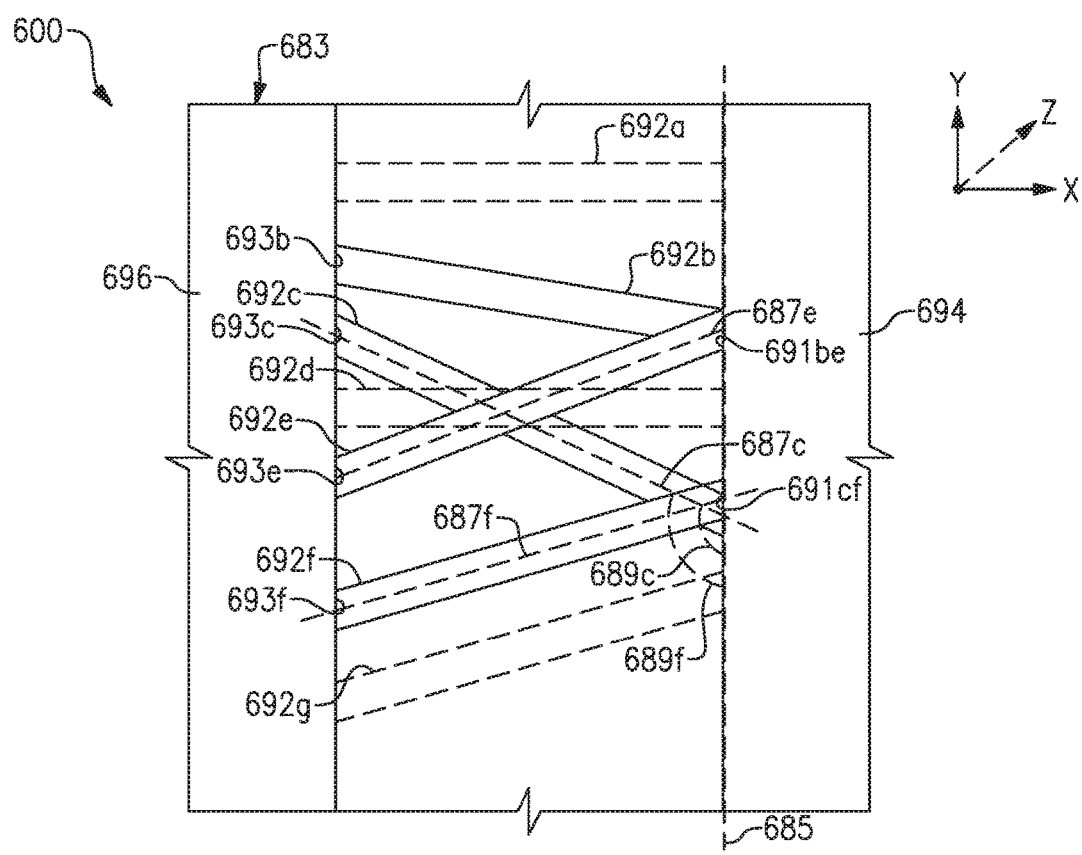
FIG. 9B illustrates a side view of a casting core corresponding to the cooling arrangement of FIG. 9A.

FIG. 9B illustrates a side view of a casting core 683 corresponding to the cooling arrangement 678 of the embodiment in FIG. 9A. The casting core 683 includes a first set of crossover connectors 692b, 692e sharing a common port such as first end 691be, and also a second set of crossover connectors 692c and 692f configured to also share a common port such as first end 691cf. In other embodiments, one or more of the common ports corresponds to an outlet of a cooling passage.

In some embodiments, at least one set of crossover connectors 692 sharing a common port have different relative orientations. In one example, the crossover connector 692c defines a vertical angle 689c and the crossover connector 692f is arranged at a second, different vertical angle 689f with respect to the spanwise axis 685. As shown, the spanwise 685 is defined along a first end 691cf corresponding to the crossover connectors 692c, 692f. However, the spanwise axis 685 can be arranged at different positions along the x, y and/or axis, depending on the needs of a particular situation. In some embodiments, a lateral projection of the passage axis 687c of the crossover connector 692c onto a reference plane (extending along the x and y-axis, for example) intersects a lateral projection of the passage axis 687e of the crossover connector 692e.

Figure 9C:
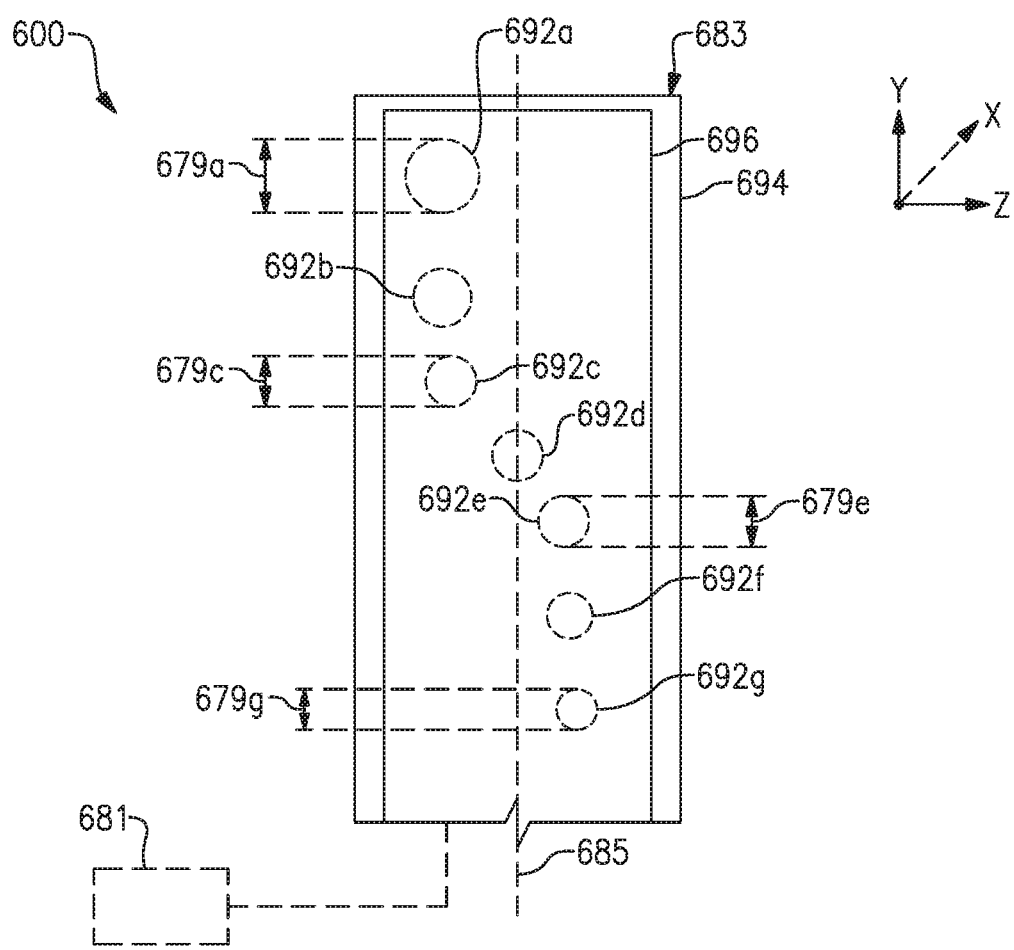
FIG. 9C illustrates a front view of select portions of a casting core corresponding to the cooling arrangement of FIG. 9A.

FIG. 9C illustrates a front view of the casting core 683 corresponding to the cooling arrangement 678 configured to meter a flow of coolant to and/or from the crossover passages 686 corresponding to the crossover connectors 692 of the casting core 683. The casting core 683 includes a plurality of crossover connectors 692 having different cross-sectional diameters or areas relative to the spanwise axis 685 to meter coolant provided to a feeding cavity corresponding to one of a first portion 694 and a second portion 696 of the casting core 683.

In one embodiment, the crossover connectors 692 are arranged such that a cross-section 679 of at least some of the crossover connectors 692 increases along the spanwise axis 685. For example, the crossover connector 692e defines a first cross-sectional diameter or area 679e which is greater than a cross-sectional diameter or area 679g of crossover connector 692g but is less than a cross-sectional diameter 679a of crossover connector 692a. In this example, each of the cross-sectional diameters or areas 679 increases along the spanwise axis 685 relative to coolant flow provided by a coolant source 681. This arrangement meters or distributes a flow of coolant to selected portions of an airfoil or other component adjacent to the crossover passages 686 formed by the casting core 683, thereby reducing the overall cooling requirements of the component. Although the cross-sectional diameters or areas 679 of the crossover connectors 692 are shown increasing in a direction away from the coolant source 681, in other examples the cross-sectional diameter or areas 679 decreases relative to the coolant source 681 and/or has the same cross-sectional diameter or area 679 as adjacent crossover connector(s) 692.

Figure 9D:
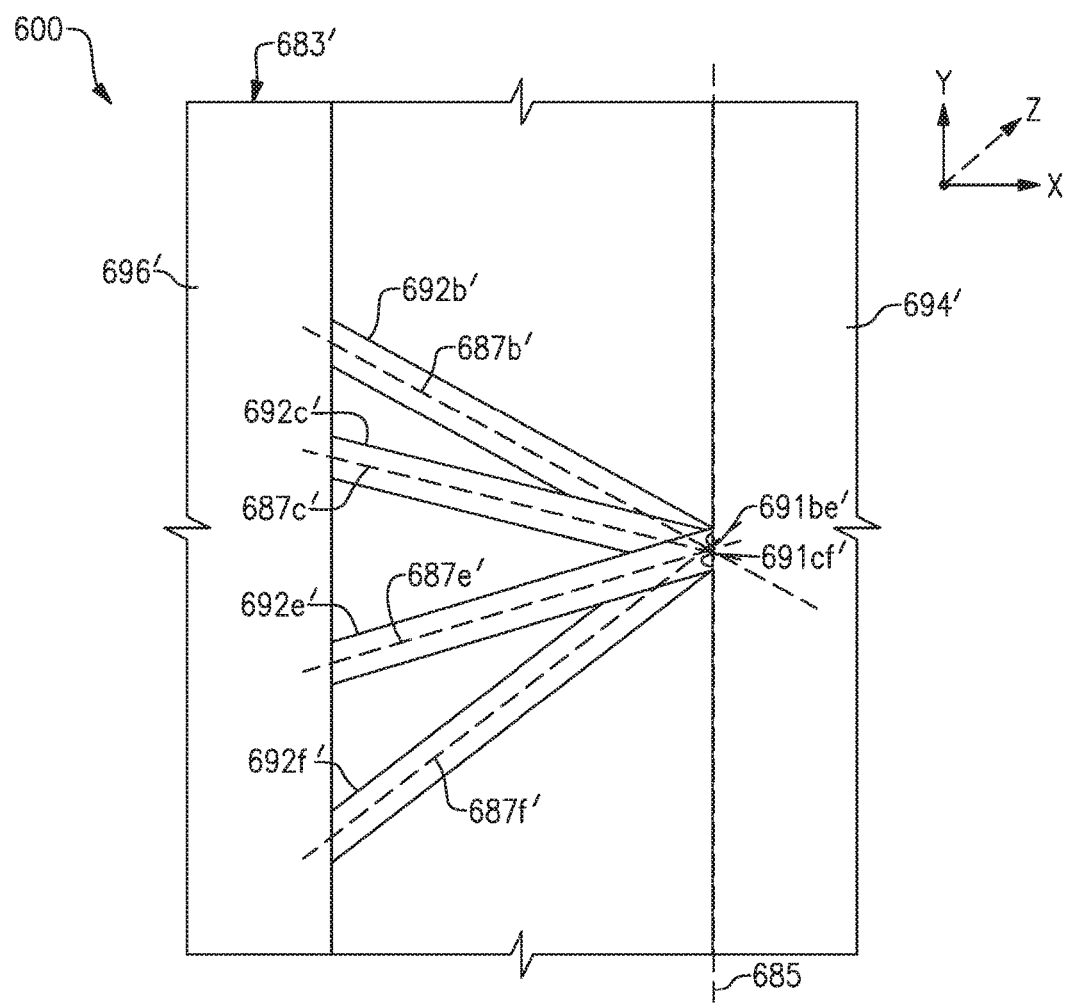
FIG. 9D illustrates a side view of another casting core corresponding to the cooling arrangement of FIG. 9A.

FIG. 9D illustrates a side view of another casting core 683' corresponding to the cooling arrangement 678 of FIG. 9A. Crossover connectors 692 corresponding to crossover passages 686a, 686d and 686g are omitted for clarity, but can be arranged as shown in for corresponding crossover connectors shown in FIG. 9B. The casting core 683' includes a first set of crossover connectors 692b', 692e' sharing a common port such as first end 691be', and also a second set of crossover connectors 692c' and 692f' configured to also share a common port such as first end 691cf'. The first ends 691be' and 691cf' are aligned along in a direction along the y-axis, but are spaced apart in a direction along the z-axis such that corresponding inlets 698be, 698cf (shown in FIG. 9A) are aligned in the radial direction R, but are spaced apart in the thickness direction T. Rather, a projection in a direction along the z-axis of a passage axis 687' of each of the crossover connectors 692b', 692c', 692e' and 692e' intersect each other at the common first ends 691be' and 691cf'.

FIG. 9E illustrates a cooling arrangement 778 according to an additional embodiment 700 having common ports staggered about a reference plane 763 and on opposite ends of the crossover connectors 786. A first set of crossover passages 786a and 786b share a common outlet 799ab, and another set of crossover passages 786c and 786d share a common inlet 798cd. As shown, the first set of crossover passages 786a and 786b have different inlet 798a and 798b, respectively, and the second set of crossover passages 786c and 786d have a different set of outlets 799c and 799d, respectively.

In some embodiments, one of the sets of crossover passages 786 includes ports having a different cross-sectional diameter or area 753. In one example, an inlet 798cd has cross-sectional diameter or area 753cd and corresponding to outlets 799c and/and 799d have different cross-sectional diameters or areas 753c and 753d. This arrangement provides different cooling volumes to select portions of an impingement cavity 784, such as suction and pressure sides of an airfoil, thereby reducing the overall cooling requirements of the cooling arrangement 778.

The common outlet 799ab of the first set of crossover passages 786a and 786b is located on an opposite side of the reference plane 763 than the common inlet 798cd of the second set of crossover passages 786C and 786D. This arrangement increases the rigidity of the corresponding casting core while also providing additional cooling capacity to surrounding portions of the internal wall 790 and select areas of the impingement cavity 784. In some examples, at least some of the crossover passages 786 define a passage axis 787 having a curved geometry, such as passage axis 787b and 787d, for example.

Although the inlets 798a, 798b of the first set of crossover passages 786 and the outlets 799c, 798d of the second set of crossover passages 786 are shown as being positioned on opposite sides of the reference plane 763, in other examples, the inlets 798a, 798b and/or the outlets 799c, 798d are positioned on a common same side of the reference plane 763 to provide additional coolant capacity surfaces of surrounding portions of the internal wall 790 separating the feeding cavity 782 and the impingement cavity 784. In other examples, the cooling arrangement 778 includes one or more additional crossover passages 786 arranged in any manner discussed in this disclosure.

Figure 10:
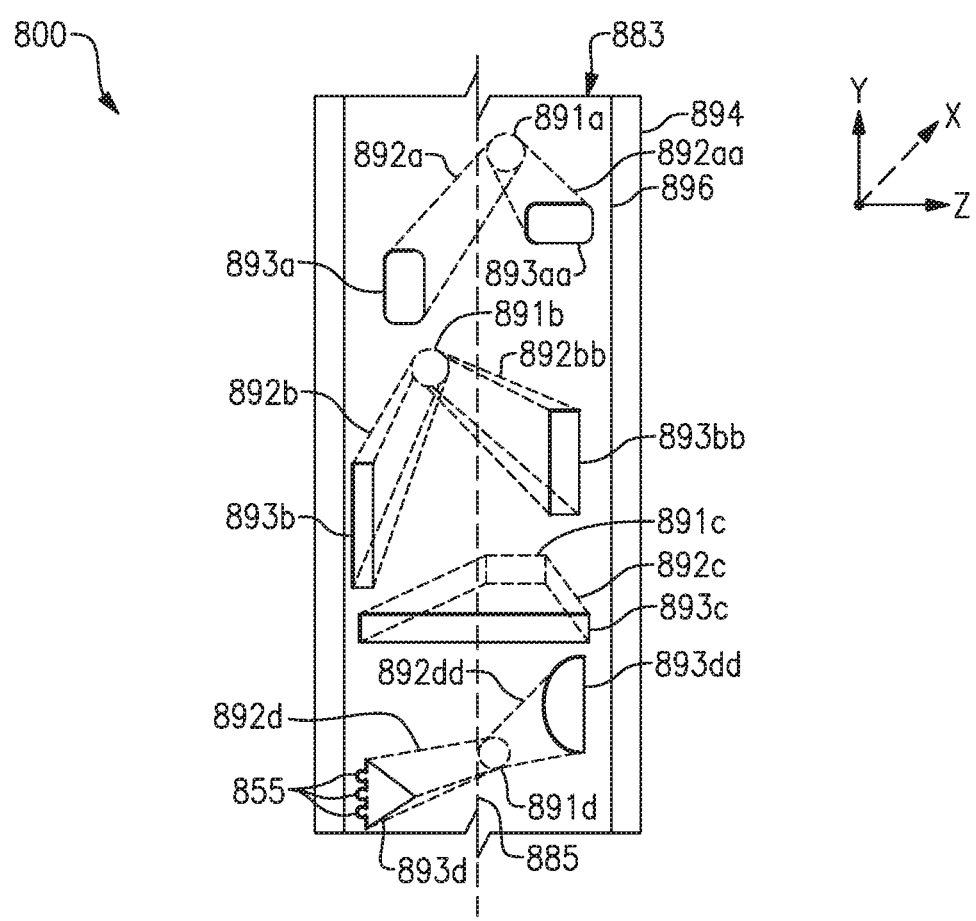
FIG. 10 illustrates a front view of a casting core corresponding to an eighth embodiment of a cooling arrangement.

FIG. 10 illustrates a casting core 883 according to a further embodiment 800 having crossover connectors 892 each with various geometries and orientations. As shown, each crossover connectors 892 has a different cross-sectional geometry for the first end(s) 891 than corresponding second end(s) 893. For example, a pair of crossover connectors 892a and 892aa share a common port or first end 891a having a generally elliptical geometry. The second end 893a of the first crossover connector 892a has a generally oblong geometry arranged in a first orientation, and a second end 893aa of the second crossover connector 892aa has an oblong geometry arranged in a second, different orientation than the second end 893aa.

In another embodiment, a set of ports may have different cross-sectional profiles and/or geometries as illustrated by second ends 893b and 893bb. As shown, the second ends 893b and 893bb have been generally rectangular geometry and at least partially overlap axially along the spanwise axis 885.

In one example, crossover connector 892c includes a first end 891c having a different cross-sectional area than a second end 893c. In some examples, the cross-sectional area of the second end 893c is larger than the cross-sectional area of the first end 891c. As shown, the first end 891c is located on one side of the spanwise axis 885, and the second end 893c extends along both sides of the spanwise axis 885.

Other complex geometries for the crossover connectors 892 are contemplated. In one embodiment, crossover connector 892dd shares a common first end 891d with another crossover connector 892d. The crossover connector 892dd has a second end 893dd with a generally semicircular geometry. The crossover connector 892d has a second end 893d with a generally triangular geometry. In some embodiments, the crossover connectors 892 have one or more diffusion features 855 to further distribute the coolant and can be arranged depending on the needs of a particular situation. It should be appreciated that each of the various crossover connectors 892 shown in FIG. 10 can be utilized individually or in combination with any of the crossover connectors and/or cooling passages described in this disclosure.

Figure 11:
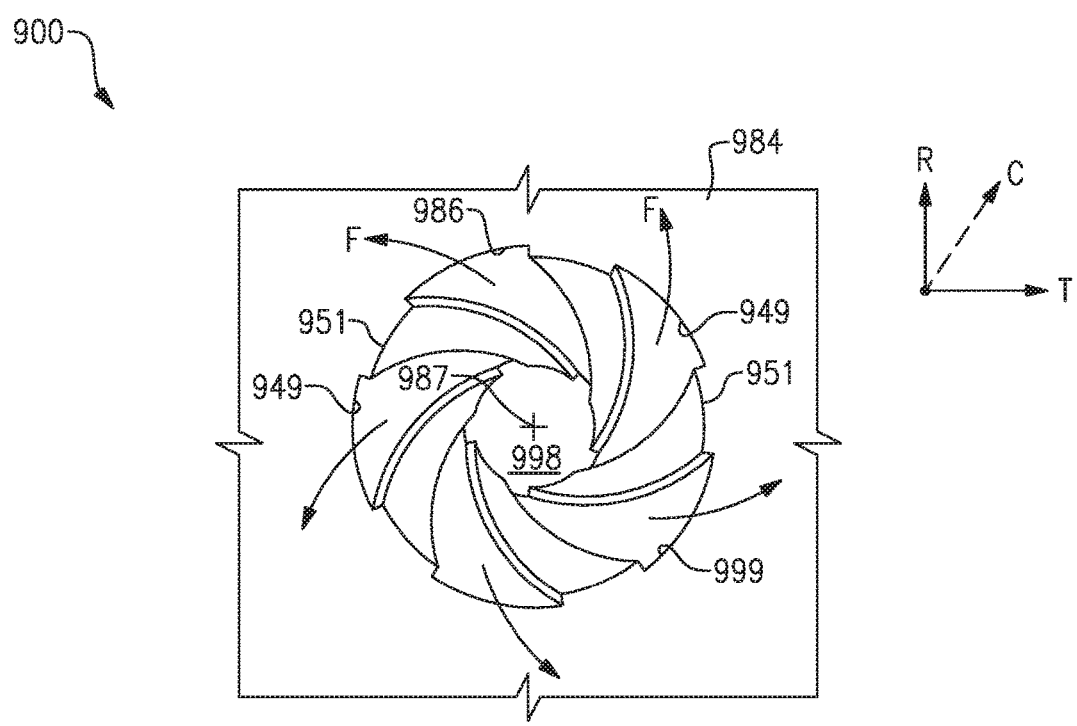
FIG. 11 illustrates a front view of a crossover passage corresponding to a ninth embodiment of a cooling arrangement.

Referring to FIG. 11, a front view of a crossover passage 986 according to another embodiment 900 is shown. The crossover passage 986 includes one or more grooves 949 formed in surfaces of the crossover passage 986. The grooves 949 are formed between one or more ribs 951. Each groove 949 can be arranged in a helical geometry extending at least partially between an inlet 998 and an outlet 999 of the crossover passage 986. In one example, the crossover passage 986 includes a plurality of helical grooves 949 extending a length defined by the inlet 998 and 999. The grooves 949 are arranged to increase the velocity and momentum of fluid F by providing a vortex or swirling effect. The increased velocity and momentum of the fluid F provides additional cooling to select locations of an impingement cavity 984.

Figure 12:
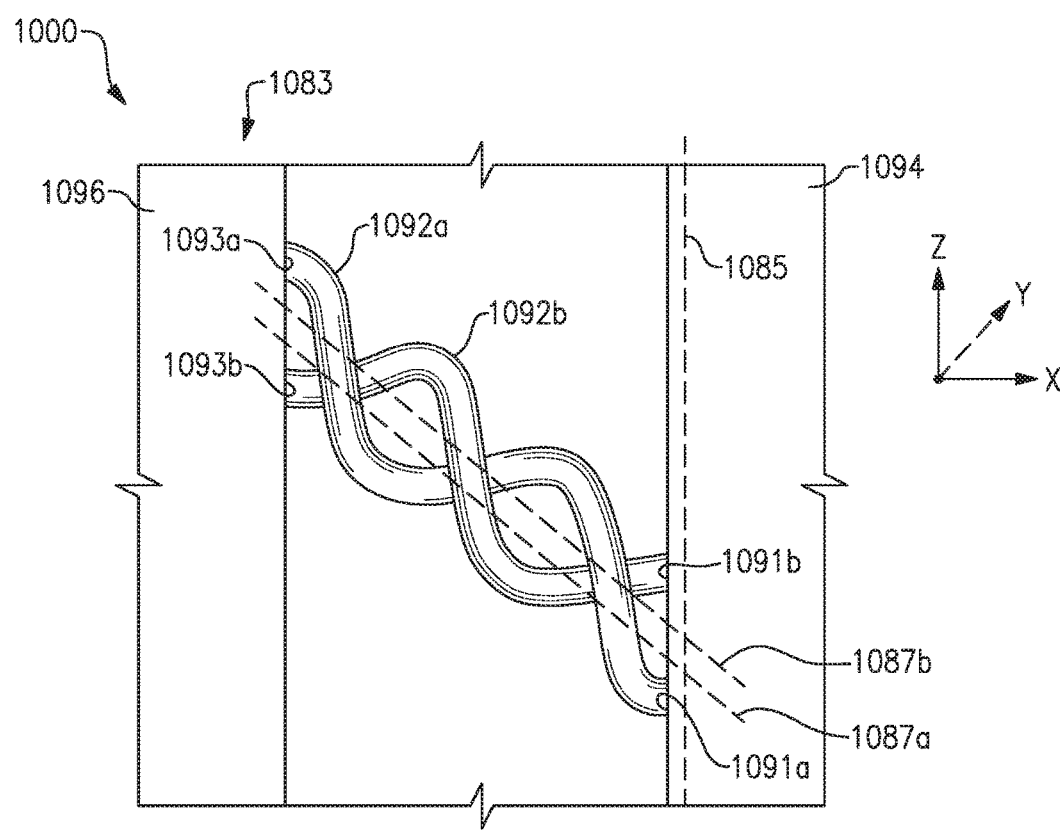
FIG. 12 illustrates a casting core corresponding to a tenth embodiment of a cooling arrangement.

FIG. 12 illustrates a casting core 1083 according to a further embodiment 1000 having one or more crossover connectors 1092 with a helical geometry. In one example, the casting core 1083 includes a first crossover connector 1092a arranged along a passage axis 1087a and a second crossover connector 1092b arranged along a passage axis 1087b. In some examples, the crossover connectors 1092a, 1092b share a common passage axis 1087. In other examples, the passage axis 1087a and passage axis 1087b are offset from each other and can be associated with a pair of first ends 1091 and/or second ends 1093 staggered about a reference plane as discussed herein. In some examples, a projection of the passage axis 1087*a* onto a reference plane (extending along the y and x-axis, for example) intersects a projection of the passage axis 1087*b* on the reference plane. In some embodiments, each of the crossover connectors 1092*a*, 1092*b* has a generally elliptical cross section as depicted in FIG. 12, although other geometries are contemplated.

In other embodiments, the crossover connectors 1092*a* and 1092*b* are located at different locations relative to the first portion 1094 and the second portion 1096 of the casting core 1083 such that a projection of the crossover connectors 1092*a* and 1092*b* do not overlap along the y-axis, for example. The crossover connectors 1092*a* and/or 1092*b* can be arranged to replace any crossover connector of this disclosure, either singly or in combination. In one example, a pair of the crossover connectors 1092*a* and 1092*b* replaces each of the crossover passages 692*b*, 692*e* shown in FIG. 9B. The helical arrangement of each crossover connector 1092 provides additional surface area within the corresponding crossover passages formed by the crossover connectors 1092, thereby providing additional cooling to surrounding regions.

Although the various embodiments of this disclosure illustrates various arrangements with respect to a single casting core or set of crossover passages, it should be appreciated that any of the arrangements of the crossover passages and crossover connectors described in this disclosure can be utilized in any combination depending on the needs of a particular situation.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil, comprising:
    an airfoil section extending in a spanwise direction from a platform section, said airfoil section having an external wall and an internal wall;
    a first cavity and a second cavity separated by said internal wall, said internal wall defining a first reference plane extending in said spanwise direction and through said first cavity and said second cavity;
    a first set of ports and a second set of ports distributed along said internal wall in said spanwise direction and positioned on opposite sides of said first reference plane, said first and second sets of ports defined along surface of said internal wall that define said second cavity;
    a plurality of crossover passages within said internal wall and connecting said first cavity to said second cavity, said plurality of crossover passages arranged such that a passage axis of each of said plurality of crossover passages intersects a surface of said second cavity;
    wherein said plurality of crossover passages includes a first set of crossover passages connected to a common one of said first set of ports and a second set of crossover passages connected to a common one of said second set of ports; and
    wherein said first set o f crossover passages are connected to respective ports that are positioned on opposite sides of said of said first reference plane such that said passage axis of one of said first set of crossover passage extends through said first reference plane.

2. The airfoil as recited in claim 1, wherein said first set of crossover passages are positioned on a common side of said first reference plane.

3. The airfoil as recited in claim 1, comprising a third set of ports each connected to one of said first set of crossover passages and distributed along said internal wall, and at least two of said third set of ports are positioned on opposite sides of said first reference plane.

4. The airfoil as recited in claim 3, wherein said internal wall defines a second reference plane perpendicular to said first reference plane, and said first set of crossover passages and said second set of crossover passages are arranged such that a spanwise projection of said passage axis of at least one of said first set of crossover passages onto said second reference plane intersects a spanwise projection of said passage axis of at least one of said second set of crossover passages onto said second reference plane.

5. The airfoil as recited in claim 4, wherein said second set of crossover passages are connected to respective ports that are positioned on opposite sides of said first reference plane such that said passage axis of one said second set of crossover passages extends through said first reference plane.

6. The airfoil as recited in claim 5, wherein at least one crossover passage of said plurality of crossover passages has a helical groove extending inwardly from surfaces of said crossover passage.

7. The airfoil as recited in claim 1, wherein a cross-sectional area of each of said first set of crossover passages is different than a cross-sectional area of each of said second set of crossover passages.

8. The airfoil as recited in claim 7, wherein said first set of crossover passages are distributed such that a cross-sectional area of said each of said first set of crossover passages increases in said spanwise direction.

9. The airfoil as recited in claim 1, wherein a cross-sectional area of at least one of said first set of crossover passages is different than a cross-sectional area of another one of said first set of crossover passages.

10. The airfoil as recited in claim 1, wherein said first set of ports are adjacent to said first cavity and said second set of ports are adjacent to said second cavity.

11. The airfoil as recited in claim 1, wherein said first set of crossover passages and said second set of crossover passages are arranged such that a lateral projection of said passage axis of at least one of said first set of crossover passages onto said first reference plane intersects a lateral projection of said passage axis of at least one of said second set of crossover passages onto said first reference plane.

12. The airfoil as recited in claim 11, wherein at least one of said first set of ports and at least one of said second set of ports are radially aligned in said spanwise direction.

13. The airfoil as recited in claim 1, wherein said platform section defines at least one of said first set of ports.

14. The airfoil as recited in claim 1, wherein said second cavity is bounded by said external wall.

15. The airfoil as recited in claim 1, wherein at least one of said plurality of crossover passages includes a helical geometry.

16. The airfoil as recited in claim 1, wherein at least one of said plurality of crossover passages has a helical groove.

17. An airfoil, comprising:
an airfoil section extending in a spanwise direction from a platform section, said airfoil section having an external wall and an internal wall, said internal wall defining a first reference plane extending in said spanwise direction and through a thickness of said internal wall;
a first cavity and a second cavity separated by said internal wall;
a plurality of crossover passages within said internal wall and connecting said first cavity to said second cavity, each of said plurality of crossover passages defining a passage axis, said plurality of crossover passages distributed in said spanwise direction and arranged such that said passage axis of each of said plurality of crossover passages intersects a surface of said second cavity; and
wherein said plurality of crossover passages includes a first set of crossover passages and a second set of crossover passages, said first set of crossover passage including a first set of ports and said second set of crossover passage including a second set of ports, said first and second set cavity, said first and second sets of ports positioned wall that define said second cavity, said first and second sets of ports positioned on opposite sides of said first reference plane, at least two of said first set of crossover passages including a helical geometry, and wherein said at least two of said first set of crossover passages are interlaced.

18. The airfoil as recited in claim 17, wherein said at least two of said first set of crossover passages are arranged along a common axis.

19. The airfoil as recited in claim 18, wherein said at least two of said first set of crossover passages are spaced apart from each other.

20. The airfoil as recited in claim 17, wherein at least one of said first set of crossover passages includes a first helical geometry, and at least one said second set of crossover passages includes a second helical geometry arranged such that an axial projection of said passage axis of said at least one of said first set of crossover passages onto said first reference plane intersects an axial projection of said passage axis of said at least one said second set of crossover passages onto said first reference plane.

21. A gas turbine engine, comprising:
a rotor including an airfoil and a vane spaced axially from said rotor; and
wherein at least one of said airfoil and said vane includes an airfoil section, said airfoil section extending in a spanwise direction from a platform section, said airfoil section comprising:
an external wall and an internal wall;
a first cavity and a second cavity separated by said internal wall, said internal wall defining a first reference plane extending in said spanwise direction and through said first cavity and said second cavity;
a first set of ports and a second set of ports defined along surfaces of said internal wall in said spanwise direction and positioned on opposite sides of said first reference plane;
a plurality of crossover passages within said internal wall and connecting said first cavity to said second cavity, said plurality of crossover passages arranged such that a passage axis of each of said plurality of crossover passages intersects a surface of said second cavity;
wherein said plurality of crossover passages includes a first set of crossover passages connected to a common one of said first set of ports and a second set of crossover passages connected to a common one of said second set of ports; and
wherein said first set of crossover passages are connected to respective ports that are positioned on opposite sides of said first reference plane such that said passages axis of one of said first set of crossover passages extends through said first reference plane.

22. The gas turbine engine as recited in claim 21, wherein said first set of ports are positioned adjacent to said first cavity and said second set of ports are positioned adjacent to said second cavity.

23. The gas turbine engine as recited in claim 21, wherein at least one of said first set of crossover passages and at least one of said second set of crossover passages each includes a helical geometry.

* * * * *